(12) United States Patent
Adler

(10) Patent No.: US 6,930,655 B2
(45) Date of Patent: Aug. 16, 2005

(54) DISPLAY MONITOR HAS STAND-ALONE MODE AND PC PERIPHERAL MODE

(75) Inventor: Glenn Adler, Redwood City, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/919,661

(22) Filed: Jul. 31, 2001

(65) Prior Publication Data

US 2003/0025683 A1 Feb. 6, 2003

(51) Int. Cl.$^7$ .................................................. G09G 5/00
(52) U.S. Cl. ........................ 345/3.1; 345/903; 345/969; 345/970
(58) Field of Search ........................ 345/3.5, 156, 903, 345/501, 504, 520, 969, 970

(56) References Cited

U.S. PATENT DOCUMENTS

| | | | |
|---|---|---|---|
| 5,877,699 A | | 3/1999 | Sharpe et al. |
| 5,877,745 A | * | 3/1999 | Beeteson et al. ............ 345/156 |
| 6,049,450 A | * | 4/2000 | Cho et al. .................... 361/683 |
| 6,337,712 B1 | | 1/2002 | Shiota et al. |
| 6,437,974 B1 | | 8/2002 | Liu |
| 6,529,236 B1 | | 3/2003 | Watanabe |
| 6,535,243 B1 | | 3/2003 | Tullis |
| 2002/0193141 A1 | * | 12/2002 | Wu ............................. 455/556 |

FOREIGN PATENT DOCUMENTS

| | | |
|---|---|---|
| DE | 4200638 A1 | 1/1992 |
| EP | 0889635 A2 | 1/1999 |
| EP | 0936808 A1 | 8/1999 |
| EP | 0889635 A3 | 1/2001 |

OTHER PUBLICATIONS

U.S. Appl. No. 09/663,586 Stand–Alone Monitor as Photograph Slide Show Projector.

Sony PVA–55 digital photo frame using memory stick, Vogelzang brochure, Dec. 1999 (including translation of advertisement text).

Announcement entitled "Sony to Sell Liquid Crystal TV With Memory Stick", Nikkei Industrial Daily, Apr. 13, 2000.

Kim, James L. "Sony CyberFrame PHD–A55", Oct. 1, 1999, TechTV, http://www.techtv.com/freshgear/products/story/0,23008,23334151.html.

"Sony PHDA55 Memory Stick Digital Photo Frame," http://www.outpost.com/template/boutiques/sony/product_detail/2557131/SonyMavica/spot4.

Gimein, Mark. "Sony's $900 Picture Frame," Oct. 27, 1999, Salon Technology, http://www.salon.com/tech/log/1999/10/27/memory_stick/.

Louderback, Jim. "Hagiwara Lukis JPEG Image Viewer," Apr. 21, 1999, TechTV, http://www.techtv.com/freshgear/specialeventsstory/0,23008,2245206,00.htm.

"Welcome to the Future at Memory Stick Pavillion@Comdex," Nov. 2000, Memory Stick Business Center, Tokyo, Japan.

"What Video Widescreen Entertainment Articles," (c)2002, http://www.whatvideotv.com/articles/hardware/200101_tvs.shtml.

\* cited by examiner

*Primary Examiner*—Regina Liang
*Assistant Examiner*—Duc Q Dinh
(74) *Attorney, Agent, or Firm*—Kevin Simons

(57) ABSTRACT

A display monitor has at least a stand-alone operational mode, and a further operational mode as a further peripheral to, e.g., a PC. The monitor has an input for connecting to a first peripheral device. The monitor also has circuitry for enabling data communication with the first peripheral device for user control of a functionality of the display monitor in the stand-alone mode, and for data communication between the first peripheral and the PC via the monitor when the monitor is in the further operational mode and connected to the PC and to the first peripheral.

3 Claims, 1 Drawing Sheet

DISPLAY MONITOR HAS STAND-ALONE MODE AND PC PERIPHERAL MODE

FIELD OF THE INVENTION

The invention relates to a display monitor device that has multiple operational modes. More particularly, the invention relates to such a device that has an operational mode being of a stand-alone functionality, as well as a mode wherein it serves as an output device, e.g., in order to render a GUI, for a PC.

BACKGROUND ART AND SUMMARY OF THE INVENTION

A PC Peripheral is generally plugged directly into the PC via an interface connector. Most commonly today, that connector is becoming the USB (Universal Serial Bus) connector, increasingly more replacing, e.g., IDE, RS232, and other interfaces. The invention relates to the use, in more than one way, of PC peripherals, i.e., any input or output devices which can be used to control, input data to, or output data from a desktop PC excluding the display device (monitor or display) that is normally connected to that PC. The invention relates to a display device that works in more than one mode, one mode being a slave to a host device (e.g., PC or STB), the other(s) modes being stand-alone function(s) contained in the display device (stand alone application/appliance function). A second peripheral is connected directly to the monitor (or display) via a wire or wirelessly. Data from that peripheral is used for stand-alone function(s) contained in the display device. For instance, a mouse can be used to control parameters or set-up of the display. This function occurs without intervention of the PC. Therefore, the display device has the circuitry and software onboard itself in order to interpret the data directly received from the peripheral. During the time interval wherein the display device is utilizing the data from the peripheral in question, this data is not passed on to the host device. Furthermore, when the display device is switched to "slave" mode, (e.g., into a mode wherein it serves as a monitor for a PC), the data from the peripheral is passed through to the host. This can be achieved either via a wire or wirelessly. The data is presented and processed in a manner consistent with industry standard peripherals, which the host can interpret in the same way in which it would a peripheral connected directly to itself.

For completeness, monitors used on the MacIntosh currently allow peripherals to be plugged into the monitor. However, these peripherals use a USB hub in the monitor. The hub is simply a repeater function. The monitor itself, however, does not use directly this data from the peripherals for a stand-alone functionality.

The re-use according to the invention of a peripheral for multiple functionalities saves cost, desk space and wiring complexity in comparison with the case wherein two or more different peripherals are to be used. In addition, connecting the peripherals to the monitor provides a more convenient and overseeable way to the user of physically configuring the PC or STB system. Moreover, the display monitor according to the invention can be used as an independent appliance, in addition to its conventionally being used as a peripheral to a PC or to another data processing system when properly hooked up.

BRIEF DESCRIPTION OF THE DRAWING

The invention is further explained below, by way of example, and with reference to the accompanying drawing, wherein.

DETAILED EMBODIMENTS

Figure 1:
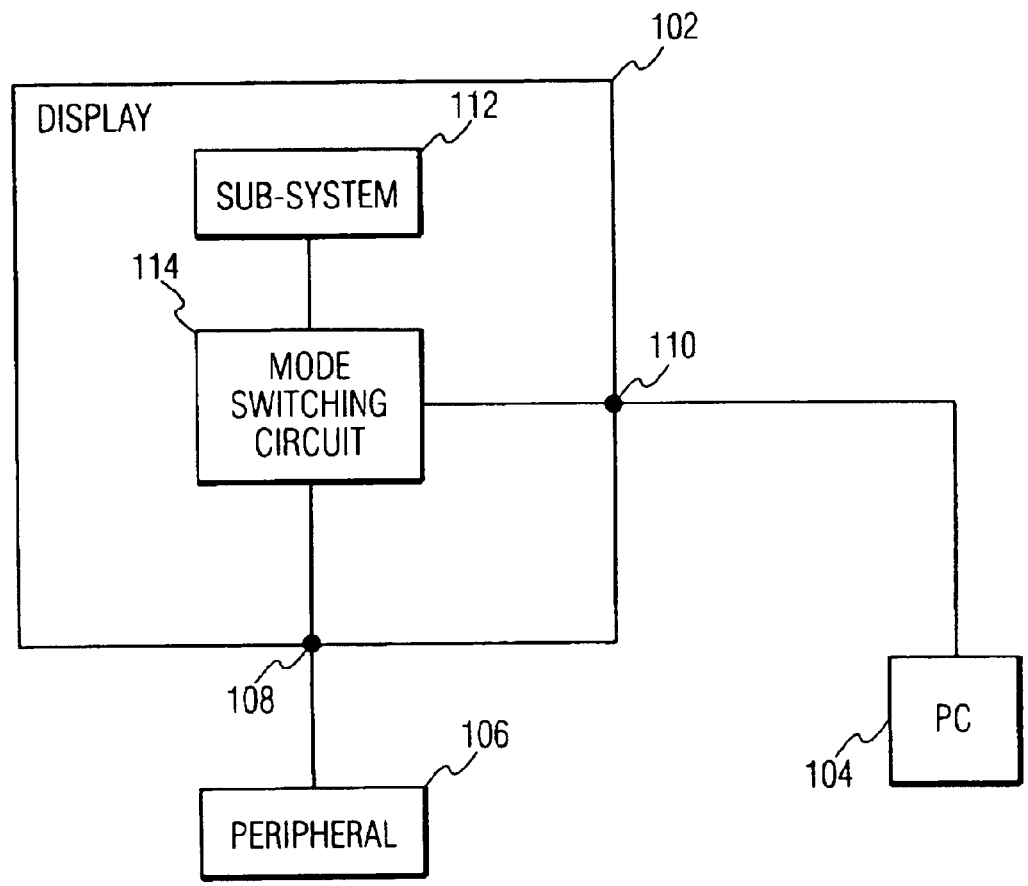
FIG. 1 is a block diagrams of a system in the invention.

FIG. 1 is a block diagram of a system 100 in the invention. System 100 comprises a display monitor 102, a PC 104 and a peripheral device 106. Monitor 102 has a connection 108 for connecting with peripheral device 106, and a connection 110 for connection to PC 104. Monitor 102 has multiple operational modes. In a first mode, monitor 102 operates as a peripheral to PC 104. For example, monitor 102 serves as an output device to PC 104 when monitor 102 has been set into the first operational mode. In a second operational mode, monitor 102 operates as a stand-alone device, i.e., independent of PC 104. For example, monitor 102 comprises a sub-system 112 for enabling to render a digital image stored on, e.g., a removable solid state memory. As another example, sub-system 112 comprises a wireless modem and data processing capabilities to enable wireless data communication between the stand-alone monitor and an external data source. In the latter example, the data processing capabilities allow, e.g., to receive compressed video data and decompress and render the data locally at monitor 102.

Monitor 102 comprises a mode switching circuit 114. Circuit 114 determines in which of the modes monitor 102 is being used. For example, circuit 114 detects whether or not monitor 102 is physically (wired or wireless) connected to PC 104. When monitor 102 is connected to PC 104 via connection 110, circuit 114 determines that monitor 102 itself is being used as a peripheral, in this case to PC 104. When monitor 102 is disconnected from PC 104, circuit 114 enables to determine that monitor 102 is being used as a stand-alone appliance. For, e.g., a VGA connection, the presence or absence of a PC is detectable in a simple way. The PC provides +5V on one of the VGA connector pins. If the PC is powered, +5V is present. However, there may be other states where the PC is present and the monitor is still operational in a stand alone mode (for instance when the PC is sleeping). Alternatively, circuit 114 comprises a simple switch to be flipped by the user in order to set monitor 102 to the proper operational mode, independently of an automatic detection of the presence or absence of a functional connection to PC 104.

Peripheral device 106 enables user interaction with PC 104, e.g., in a conventional scenario, via monitor 102 in the first operational mode as if peripheral device 106 were directly connected to PC 104. Device 106 enables user interaction with monitor 102 directly in the second operational mode, e.g., to run a slide show or to control the processing capabilities local to monitor 102, independently of PC 104. Peripheral device 106 comprises, e.g., a user input device such as a mouse or a keyboard for data entry to PC 104 via monitor 102, or a card reader, a CD-ROM or a CD-R/W, in the first operational mode of monitor 102, and for user interaction to sub-system 112 of monitor 102 in the second operational mode of monitor 102.

Different data communication protocols may be used for communication between peripheral device 106 and monitor 102 on the one hand, and for communication between monitor 102 and PC 104 on the other hand. For example, monitor 102 is coupled to PC 104 via USB, and peripheral device 106 is connected to a PS/2 on monitor 102. In the peripheral mode of monitor 102, i.e., monitor 102 serves as a peripheral to PC 104, circuitry 114 of monitor 102 maps the PS/2 peripheral 106 to a USB peripheral for proper communication with PC 104.

Incorporated herein by reference:

U.S. Ser. No. 09/663,586 filed Sep. 18, 2000 for Glenn Adler for STAND-ALONE MONITOR AS PHOTOGRAPH SLIDE SHOW PROJECTOR. This document relates to a stand-alone monitor for viewing high-resolution digital images without the need of a PC including a means for transferring digital images directly to the stand-alone monitor; a means for displaying the digital images on a display screen of the stand-alone monitor; and a means for controlling the transfer and display of the digital images on the display screen. In one embodiment the images are received from a wireless image source, such as a digital camera. In another embodiment the images are read from an electronic storage media, such as smart media. The viewing of images on the monitor is controlled by a user, via a keypad or remote control, for instance. The keypad and reader/receiver may be integrated directly into the monitor or implemented as an interface within a separate enclosure.

What is claimed is:

1. A display monitor having:
   at least a stand-alone operational mode enabling user interaction with functionality in the monitor through a first peripheral device to the monitor, the user interaction being determined by a functionality specific to the first peripheral device;
   a further operational mode as a further peripheral to a data processing system that is separate from the first peripheral device, the monitor comprising:
      an input for connecting to the first peripheral device;
      circuitry for enabling data communication with the first peripheral device for user control of a functionality of the display monitor in the stand-alone mode, and for data communication between the first peripheral and the data processing system via the monitor when the monitor is in the further operational mode and connected to the system and the first peripheral, wherein the monitor includes mode a switching circuitry for detecting the monitor's connection state with the data processing system and determines whether the monitor should be in the stand-alone mode or the further operational mode, depending on the connection state; and
      comprising further circuitry for setting the monitor into the stand-alone operational mode or into the further operational mode depending on the voltage at a connection between the monitor and a data processing system.

2. The monitor of claim 1, wherein the further circuitry is operative to automatically set the monitor in the further operation mode when detecting the monitor being connected to the data processing system.

3. A display monitor having:
   at least a stand-alone operational mode enabling user interaction with functionality in the monitor through a first peripheral device to the monitor, the user interaction being determined by a functionality specific to the first peripheral device;
   a further operational mode as a further peripheral to a data processing system that is separate from the first peripheral device, the monitor comprising:
      an input for connecting to the first peripheral device;
      circuitry for enabling data communication with the first peripheral device for user control of a functionality of the display monitor in the stand-alone mode, and for data communication between the first peripheral and the data processing system via the monitor when the monitor is in the further operational mode and connected to the system and the first peripheral; and
      wherein the monitor includes mode a switching circuitry for detecting the monitor's connection state with the data processing system and determines whether the monitor should be in the stand-alone mode or the further operational mode, depending on the connection state.

* * * * *